Figures 1, 2:
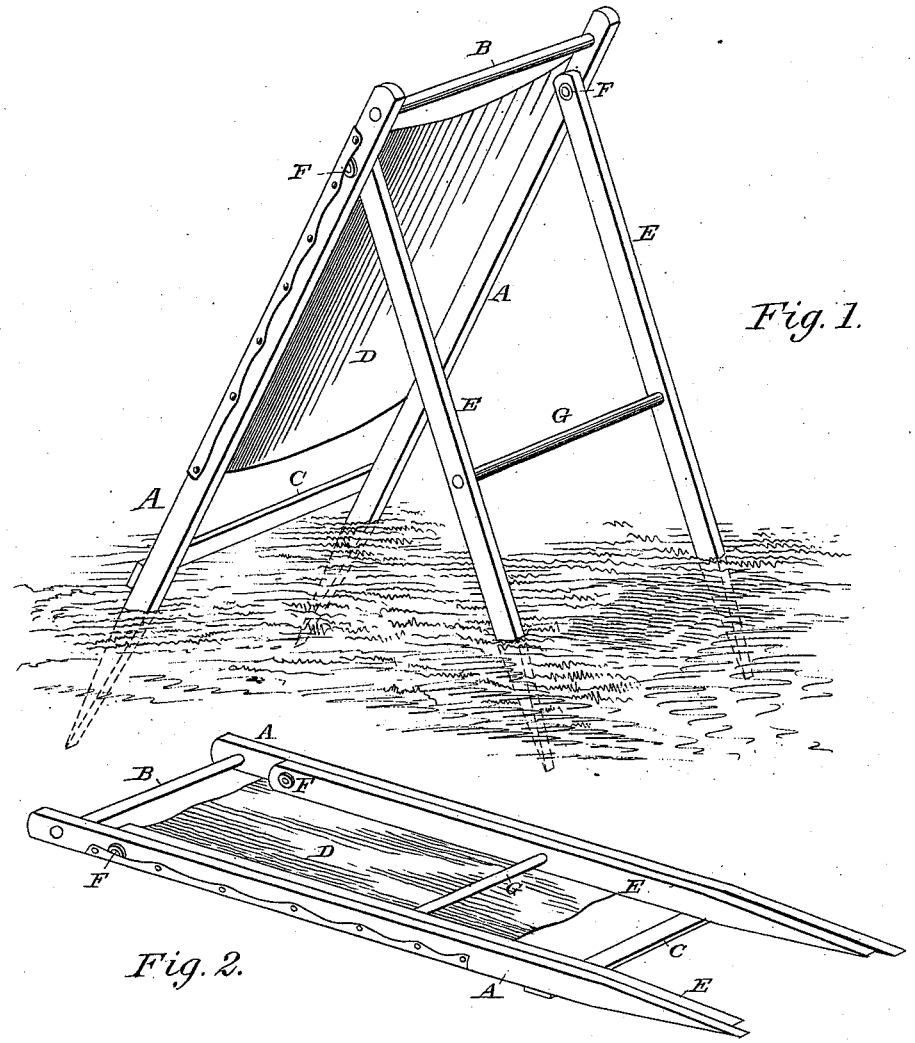

(No Model.)

J. N. BUTLER.
BACK REST.

No. 486,275. Patented Nov. 15, 1892.

WITNESSES:

INVENTOR:

JANET N. BUTLER,

BY Franklin Scott, ATTORNEY.

UNITED STATES PATENT OFFICE.

JANET N. BUTLER, OF ASBURY PARK, NEW JERSEY.

BACK-REST.

SPECIFICATION forming part of Letters Patent No. 486,275, dated November 15, 1892.

Application filed August 24, 1889. Serial No. 321,857. (No model.)

*To all whom it may concern:*

Be it known that I, JANET N. BUTLER, a citizen of the United States, residing at Asbury Park, in the county of Monmouth and State of New Jersey, have invented a new and useful Back-Rest for the Use of Persons on the Sea-Beach, of which the following is a specification, reference being had to the accompanying drawings, forming part thereof.

My invention relates to back-rests for the use of persons on the sea-beach; and its object is to provide a support for the back while sitting upon the beach at the sea-shore.

The invention is fully shown in the drawings, wherein my device is shown in perspective in Figure 1, and in Fig. 2 the same is shown as folded in proper shape for packing in a trunk or for transportation purposes.

This back-rest consists of a rectangular frame composed of two lateral stakes A A, sharpened at their bottom ends to enter the sand or earth, as shown, connected by two cross bars or rungs B and C and provided with a supporting fabric D, which is stretched across the frame and is nailed thereto or otherwise suitably fastened. This is put on at such an elevation as will best accommodate the shoulders when the sides have penetrated the ground to the right depth. To this supporting-frame a brace-frame is attached just below the top of the main frame by hinges or pins, as shown, so that the two frames can be opened or closed at will. The brace-frame consists of two parallel side pieces or stakes united by a cross piece or rung G, the said stakes E E being also sharpened, as shown, so as to freely enter the sand. The brace-frame is preferably of a width to lie between the side pieces of the main frame when the whole is folded, as seen in Fig. 2. The bottom cross-bar C of the main frame is preferably made of thin material and fastened to the upper surface of the stakes, so as not to interfere with closing down of the brace-frame in the folding process.

The rest is used by spreading the two frames as desired and then pressing the sharpened points firmly into the sand.

I am aware that back-supports have heretofore been used wherein the back-brace rested on the surface of the earth or floor; but this invention differs from all such in that all the stakes are sharpened, so as to secure a firm and solid support in the soft sand usually found on the sea-shore.

I therefore claim as my invention—

A supporting-frame having two lateral stakes sharpened at their lower ends and provided with a back and shoulder supporting fabric stretched across its front, with a brace-frame of two sharpened stakes hinged at their top ends to the upper part of the main frame, united substantially as shown, and adapted to fold together in the manner described, and for the purposes set forth.

In witness whereof I have hereto subscribed my name in the presence of two witnesses.

JANET N. BUTLER.

Witnesses:
 FRANKLIN SCOTT,
 REBECCA S. PRICE.